United States Patent Office 3,425,576
Patented Feb. 4, 1969

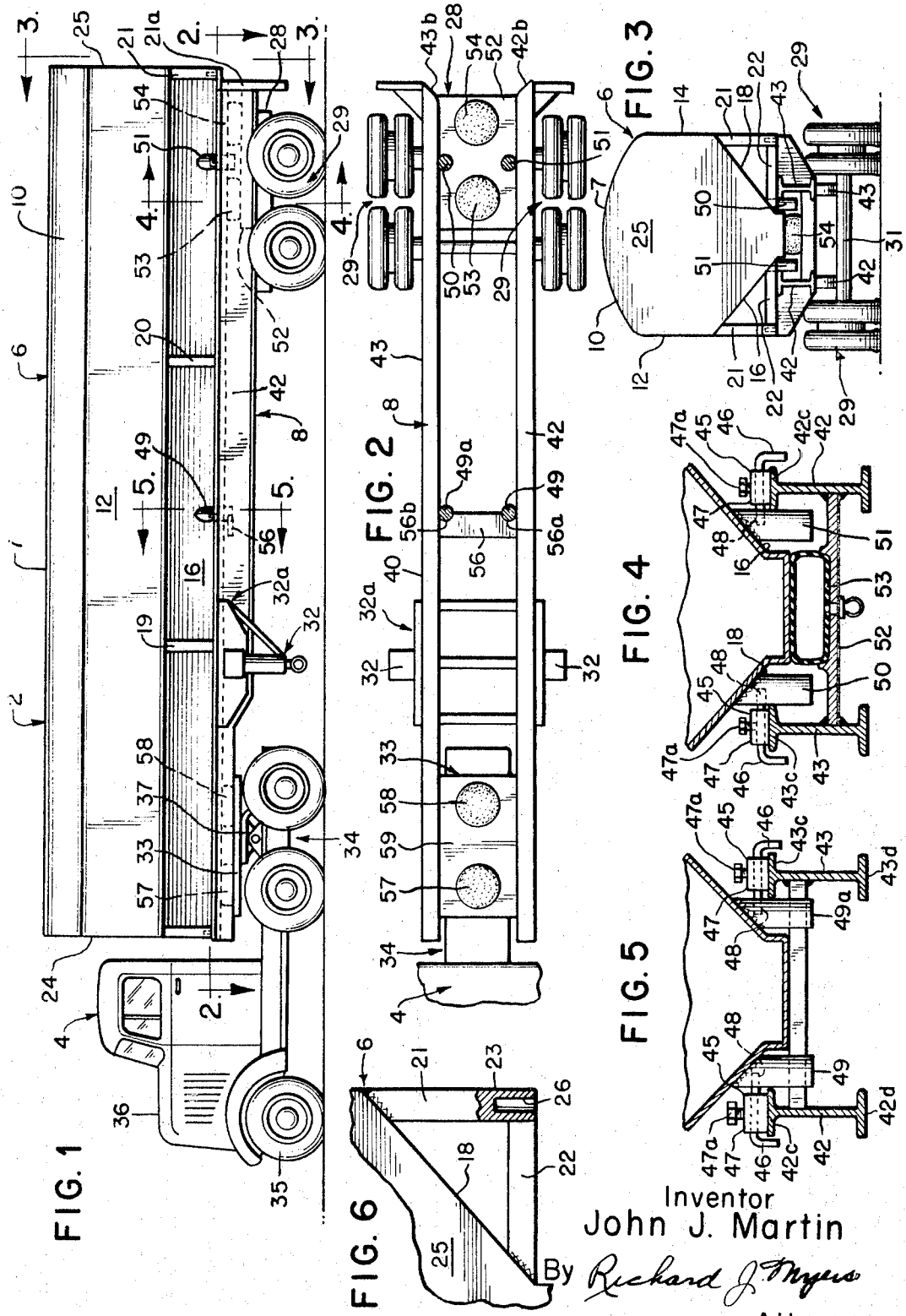

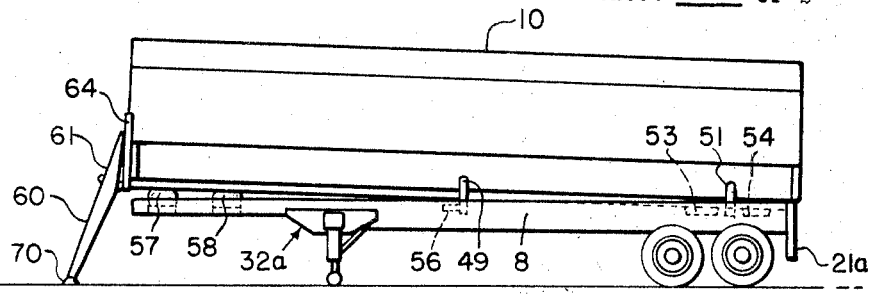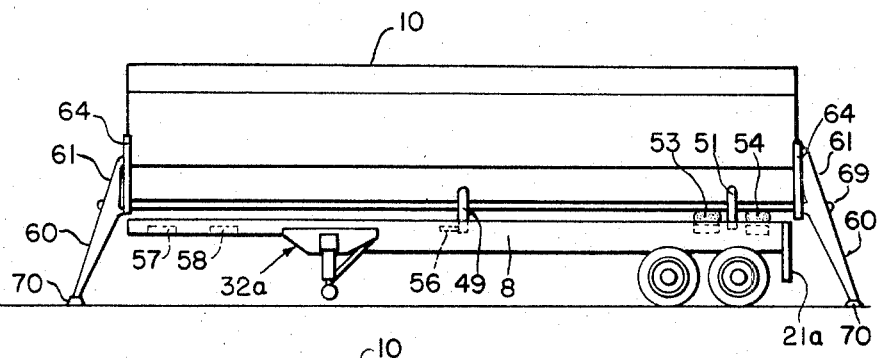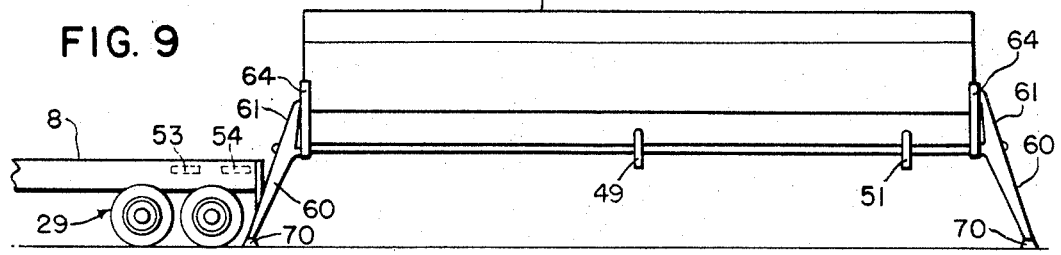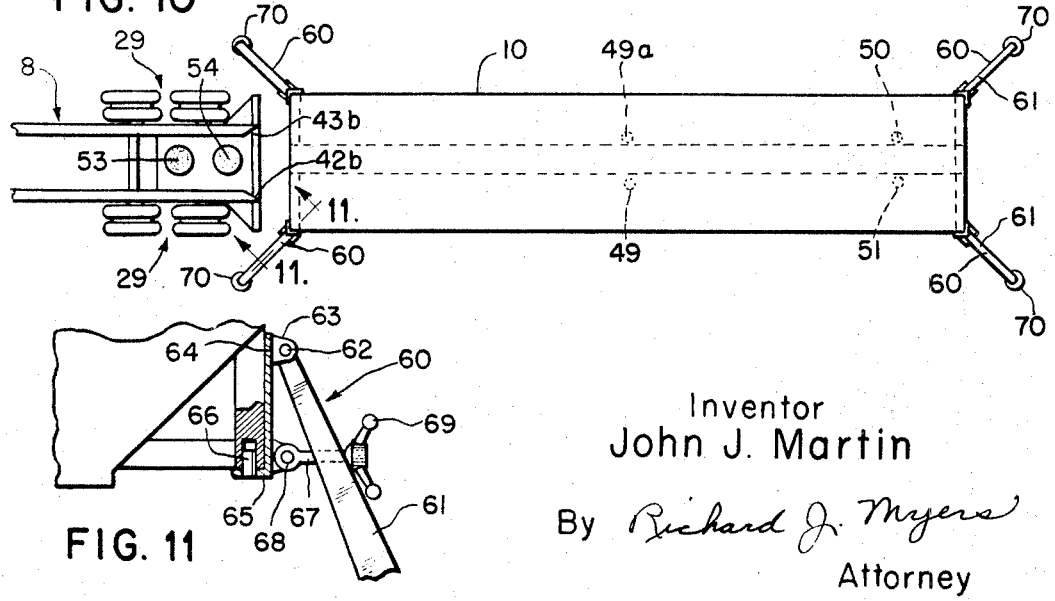

3,425,576
DETACHABLE CONTAINER-CHASSIS SYSTEM
John J. Martin, Warminster, Pa., assignor to Pullman Incorporated, Chicago, Ill., a corporation of Delaware
Filed Dec. 22, 1966, Ser. No. 603,886
U.S. Cl. 214—515      6 Claims
Int. Cl. B60p 1/64; B62d 23/00

ABSTRACT OF THE DISCLOSURE

A detachable container-chassis system and structure therefor including a container that is supported on a trailer chassis by inflatable air bag means which when inflated separate or raise the container above the chassis and whereby stilt means are connected to the container then and the chassis is pulled away from the stilt ground supported container, each container being provided with guide lugs for engaging guide ways on the trailer chassis to properly align the container with respect to the chassis.

BACKGROUND OF THE INVENTION

Field of the invention

This invention relates to containers carried on trailer chassis and is particularly adapted to the transfer of containers from the trailer chassis to some other vehicle or to a stationary storage area. For easy transfer of material between land, sea and air it is most expeditious, cost-saving and time-saving if the material to be shipped can remain in a common container as it passes from one mode of transportation to another. One form of transportation is shipment of the material by highway vehicles such as trailers or the like and particularly the shipment of such material in containers. It is this field of art to which the invention pertains.

Description of the prior art

There has heretofore been proposed various means of transferring material from one mode of transportation to another or means for storing the material while waiting to be transferred to another form of transpotation. One very common way is to provide for a standard type of container which may be carried by the trailer chassis of a highway vehicle, placed on the flat bed of a railroad car, or wherein the container may be stowed within an aircraft, or where the container may be placed aboard a sea-going vessel or ship. It is most desirable to provide for a way of removing a container from the trailer chassis so that another container with different lading may be placed on the trailer chassis. The removed container may then be stored until it may be placed upon some other mode of transportation or upon another trailer. In order to do this, it is desirable to provide a minimum amount of equipment and manpower to accomplish the transfer of containers from the trailer chassis. It is the purpose of this invention to provide for structure which will be simple, uncomplicated, easy-to-operate and require a minimum of manpower.

SUMMARY

This invention relates to an improved detachable container-chassis system and for the container-chassis structure to accomplish this. More particularly this invention is concerned with and relates to an improved container construction and chassis construction which permits ready separation of the container from the chassis and provides means for supporting the container while the chassis is taken away.

This invention further provides for guide means on the container and on the chassis for proper alignment of the container with respect to the chassis to enable easy separation of the container from the chassis and easy coupling of the container to the chassis. These and other objects, purposes and advantages will become apparent from reference to the following drawings and description.

BRIEF DESCRIPTION OF THE DRAWINGS

FIG. 1 is a side elevational view of a trailer and cab therefor;
FIG. 2 is a sectional view taken along line 2—2 of FIG. 1;
FIG. 3 is an end view taken along line 3—3 of FIG. 1;
FIG. 4 is a sectional view taken along line 4—4 of FIG. 1;
FIG. 5 is a sectional view taken along line 5—5 of FIG. 1;
FIG. 6 is an enlarged partial sectional view of the corner of the container shown in FIG. 3;
FIGS. 7 through 9 are illustrative of the system of removing a container from a chassis;
FIG. 10 is a plan view of the chassis removed from the container as shown in FIG. 9; and
FIG. 11 is a sectional view taken along line 11—11 of FIG. 10.

DESCRIPTION OF THE PREFERRED EMBODIMENT

Referring now to FIGS. 1 through 6 there is shown a highway vehicle in the form of a trailer 2 pulled by a trailer cab 4, the trailer 2 comprising a container 6 mounted upon a trailer chassis 8. In end view, shown in FIG. 3, the container 6 has an arcuate top 10, upper flat sides 12 and 14 and lower inwardly sloping and downwardly sloping side sheets 16 and 18. Extending from the juncture of the side walls 12 with the side walls 16 are supports 19, 20 and rear support 21, the sides 14 and 18 similarly at their intersections having like supports 19, 20 and 21. Each rear end support 21 joins with a lower horizontal rear end support 22 which merges with the respective sides 16 and 18 of the tank or body portion 7 of the container 6. Each container is also provided with end walls 24 and 25. It will be noted in FIG. 6 that the support 21 is provided with a bore or opening 26 which will receive a stilt container support means to be described later. As seen in FIG. 2 the tank body 7 of the container 6 mounts upon a trailer chassis 8 carrying rearward bogie assembly 28 carrying tandem wheel assemblies 29 on each side of the vehicle 2 and supported by the axle 31. The forward part of the trailer chassis 8 is provided with a landing gear assembly 32a having landing gear 32 and the most forward part of the chassis is provided with a kingpin assembly 33 which is supported by a set of tractor wheel bogie assemblies 34 of the cab 4 which carries forward wheel means 35 and engine cab 36. The bogie 34 carries the usual kingpin assembly 37 supporting the kingpin 33 on the trailer 2. It will be noted that there is a landing gear assembly 32a on each side of the trailer chassis 8. The chassis comprises a frame structure 40 which comprises a pair of longitudinally running frame members or rails 42 and 43. Each frame or rail 42 or 43 is of I-beam shape having flanges 42c, 42d, 43c, and 43d respectively. Mounted on top of each flange 42, or 43c is container chassis fastening means 45 including a pin 46, a pin block 47 mounted on the flange 42c and an aperture 48 in a guide lug 49 or 49a on each side of the container 6. The guide lugs 49, 49a ride along the inside of the webs 42c or 43c of a respective rail 42 or 43 for guiding the movement of the container 6 relative to the chassis 8, as do rearward container mounted guide lugs 50 and 51 which also contain suitable container chassis mounted fastening means 45, 45. The guide lugs 50 and 51 (as well as forward lug 49, 49a) of the container 6 ride along the inside of the respective rails 42 and 43 and have their lower extremities extending above the cross plate 52 connecting each rail 42 and 43 and supporting inflatable rear located air bag means 53. The cross plate 52 also supports another further rearwardly disposed inflatable air bag 54. The forward more centrally located lugs 49, 49a are restricted in forward movement along the chassis by restraining cross member 56 provided with notches 56a and 56b for respectively nesting parts of the lugs 49 and 49a respectively. Further inflatable longitudinally spaced air bags 57 and 58 are located at the forward end of the chassis 8 and are carried on the upper cross plate means 59 of the chassis kingpin assembly 33.

FIGS. 7 through 10 show the various positions that the chassis 8 and the container 6 may assume relative to one another when stilts 60 are placed under the raised containers. The construction of the stilts 60 may be seen by reference to FIGS. 7 through 11 and FIG. 6. The stilt 60 comprises an outwardly downwardly diagonally extending leg 61 pivotally connected at 62 to a trunnion 63 mounted on a brace 64 of L-shaped construction having its lower or bottom 65 carrying a pin 66 extendible into cavity or bore 26 of the corner casting construction 23a located at each corner of the container 6, the stilt 60 having a pin 67 extending through the leg 61 and pivotally connected at 68 to the brace 64 and having a wing nut 69 bearing against the outside of the leg 61 to adjust the angular relation of the leg 61 with respect to the brace 64, the leg 61 having a pivotal pedestal portion 70 engaging the ground. It is to be noted that the rear or tail portion of the chassis 8 has its rails 42 and 43 as seen in FIGS. 2 and 10 having tapered ends 42b and 43b to permit easy guidance and proper alignment of the pegs or lugs 49, 49a, 50 and 51 of the container to be guided in between the rails of the chassis 8. The rear sill or plate is also depressed to allow clearance for pegs or lugs 49, 49a, 50, 51.

As seen now in FIGS. 7 through 10, the air inflated container lift bags (see FIG. 7) are inflated by suitable conventional means (not shown) to allow the forward end of the container 6 to raise and separate from the chassis 8 after the container chassis locking means 45 have been disconnected in the usual manner. After the front air inflatable lift bags 57, 58 have been inflated to raise the front part of the container 6 and while this raised condition exists, stability is provided by nesting of the container 6 and chassis 8 at the rear end nesting of the container guide lugs and chassis railed frame 40 at the center. The next step is to attach each of the front stilt legs 60 and then deflate the front air lift bags 57 and 58. Next, as seen in FIG. 8, the rear air lift bags 53, 54 are inflated to raise the rear of the container 6 and then the rear set of stilts 60, 60 are attached to the rear corner castings of the container 6 and then air bags 53, 54 are deflated. Next, as shown in FIGS. 9 and 10, the chassis is then driven away from underneath the container and the container is allowed to be supported by the four stilts 60 which in elevation are at an outwardly downwardly extending angle with respect to the container as shown in FIG. 9 and also are out at a 45 degree angle to the vertical surface of the vehicle in the plan view as shown in FIG. 10, radiating out from the corner of each corner casting of the container 6. This process, of course, may be reversed and when this occurs, the guide lug stops contact the guideways of the chassis, and container is placed in position then to lower, and the fore and aft stilts 60, 60 alternately are removed after the previous inflated air bags 53, 54 and 57, 58 are deflated and then the container is locked back on the chassis.

Thus it is seen that there is provided a novel container-chassis arrangement which is provided with locking means for attaching the container to the chassis and is further provided with guide rails on the chassis and guide lugs on the container to guide movement of the container relative to the chassis when connecting the container and chassis together, or when uncoupling them for their separation from one another. It is further seen that there is provided on the forward and rearward portions of the chassis inflatable air lift bag means for elevating the forward portion of the container relative to the forward part of the chassis and then placing a stilt or leg arrangement at each forward corner of the forward portion of the chassis air bags and deflating the chassis air bags at the forward part and then performing the same function at the rearward portion of the container chassis structure whereby the rear air lift bags raise the rear portion of the container relative to the chassis and then rear leg members are attached and the rear lift bags are deflated and then the chassis may be pulled away from underneath the container and the container may be stored on the leg elements.

The foregoing description and drawing are given merely to explain and illustrate the invention and the invention is not to be limited thereto, except insofar as the appended claims are so limited, as those skilled in the art who have the disclosure before them will be able to make modifications and variations therein without departing from the scope of the invention.

What is claimed is:

1. A detachable trailer container-chassis arrangement comprising:
   a container having guide means,
   a trailer chassis having guide means adapted to receive the guide means of said container for joining of the container to the chassis,
   fore and aft inflatable means mounted in longitudinally spaced relationship from one another on the chassis and adapted for engagement and support of said container for vertical separation of the container from the chassis attendant to removal of the container from the chassis,
   said container guide means comprising a pair of lug means spaced longitudinally of one another and depending from the lower portion of the container,
   said chassis guide means comprising a pair of laterally spaced longitudinally extending rails adapted to slidingly receive said container lug means,
   said rails, each having their rearward portion diverging in lug gathering fashion and said inflatable means being mounted on chassis portions being located in clearance relation to said guide lug means.

2. The invention according to claim 1, and
said inflatable means comprising expandable container like means for receiving a gas for expanding same.

3. The invention according to claim 1, and
said arrangement having means for coupling of the container and chassis together.

4. The invention according to claim 1, and
means on said chassis for limiting movement of said container guide means.

5. The invention according to claim 1, and
means for supporting said container independent of said chassis when said chassis is separated therefrom.

6. A detachable trailer container-chassis arrangement comprising:
   a container having a pair of longitudinally spaced apart fore and aft guide lug means depending from the container,
   a trailer chassis having longitudinally extending laterally spaced apart guideway means adapted to engage with and guide the lug means of the container attendant to placing of the container on the chassis,
   fore and aft inflatable means mounted in longitudinally spaced relationship from one another on the chassis and engageable with and supporting said container for vertical separation of the container from the chassis attendant to removal of the container from the chassis,
   means on said guideway means and on said lug means for coupling of the container and chassis together when said bag means are deflated, stop means on said chassis extending between said guideway means and adapted to engage said guide lugs to limit longitudinal movement of the container with respect to said chassis when said bag means are deflated, said stop means being placed in unobstructing relation with respect to said guide lug means when said bags are inflated to permit removal of said container from said chassis, and fore and aft stilt means mounted to the respective corners of the container for supporting said container above and independent of said chassis when said means for coupling the container to the chassis are uncoupled and allowing independent support of the container relative to the chasis to permit the chassis to be removed from underneath the container.

References Cited

UNITED STATES PATENTS

| | | | |
|---|---|---|---|
| 2,117,067 | 5/1938 | Ludington | 296—35 |
| 2,609,177 | 9/1952 | Hughes | 254—93 |
| 2,868,401 | 1/1959 | LeLois | 214—515 XR |
| 3,174,722 | 3/1965 | Alm | 254—93 |
| 3,204,796 | 9/1965 | Hand | 214—515 |

ALBERT J. MAKAY, *Primary Examiner.*

U.S. Cl. X.R.

296—35